(12) United States Patent
Suzuki

(10) Patent No.: US 7,317,592 B2
(45) Date of Patent: Jan. 8, 2008

(54) AUTOMATIC MEDIUM CHANGER WITH CARRIER-PRESSURE-OPERATED MECHANICAL AUTO LOCK/UNLOCK MECHANISM

(75) Inventor: Takeshi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 443 days.

(21) Appl. No.: 10/827,362

(22) Filed: Apr. 20, 2004

(65) Prior Publication Data

US 2004/0213094 A1    Oct. 28, 2004

(30) Foreign Application Priority Data

Apr. 22, 2003    (JP)    ............... 2003-116534

(51) Int. Cl.
*G11B 33/02*    (2006.01)
*G11B 15/68*    (2006.01)

(52) U.S. Cl. .................. 360/92; 369/30.63; 720/647; 720/657

(58) Field of Classification Search ................ 360/92, 360/98.04–98.06; 369/30.06, 30.2, 30.28–30.35, 369/30.38–30.99, 31.01; 720/600–657
See application file for complete search history.

(56) References Cited

U.S. PATENT DOCUMENTS

| | | | | |
|---|---|---|---|---|
| 5,243,478 | A | * | 9/1993 | Kawakami et al. ......... 360/96.5 |
| 5,430,588 | A | * | 7/1995 | Rasmussen ................. 360/92 |
| 5,537,378 | A | * | 7/1996 | Uehara et al. ............ 360/99.06 |
| 5,570,337 | A | * | 10/1996 | Dang ..................... 369/30.39 |
| 5,590,047 | A | * | 12/1996 | Uehara .................... 360/92 |
| 6,085,123 | A | * | 7/2000 | Baca et al. ................ 700/214 |

FOREIGN PATENT DOCUMENTS

| | | | |
|---|---|---|---|
| JP | 57-181403 | A | 11/1982 |
| JP | 57-183663 | A | 11/1982 |
| JP | 62-124667 | A | 6/1987 |
| JP | 62-129844 | A | 6/1987 |
| JP | 64-35544 | U | 3/1989 |
| JP | 3-16127 | Y2 | 4/1991 |
| JP | 3-125369 | A | 5/1991 |
| JP | 4-19626 | A | 1/1992 |
| JP | 05290476 | A * | 11/1993 |
| JP | 05290479 | A * | 11/1993 |
| JP | 2550766 | B2 | 8/1996 |
| JP | 2758316 | B2 | 3/1998 |
| JP | 2763452 | B2 | 3/1998 |
| JP | 2763892 | B2 | 3/1998 |
| JP | 3093738 | B2 | 7/2000 |
| JP | 3320329 | B2 | 6/2002 |
| JP | 3089837 | U | 8/2002 |
| JP | 3392559 | B2 | 1/2003 |

\* cited by examiner

*Primary Examiner*—Craig A. Renner
(74) *Attorney, Agent, or Firm*—Sughrue Mion, Pllc.

(57) ABSTRACT

To prevent a door opening when a carrier moves without using an electric actuator and without placing a burden on a device. An auto lock/unlock mechanism is composed solely of mechanical elements, and a lock mechanism is switched between an unlocked state and a locked state using the movement of the carrier. Thereby an automatic medium changer, which does not need an electric actuator such as a solenoid and is low price, is provided. Further, an opening manipulation of the door is permitted when the carrier is located at an evacuation position. This prevents a hand or a finger from being caught in an operable portion of the device. Further, since emergency stopping measures of the carrier for preventing an accident is not required, problems of damages, overloads or the like to the device are solved.

12 Claims, 10 Drawing Sheets

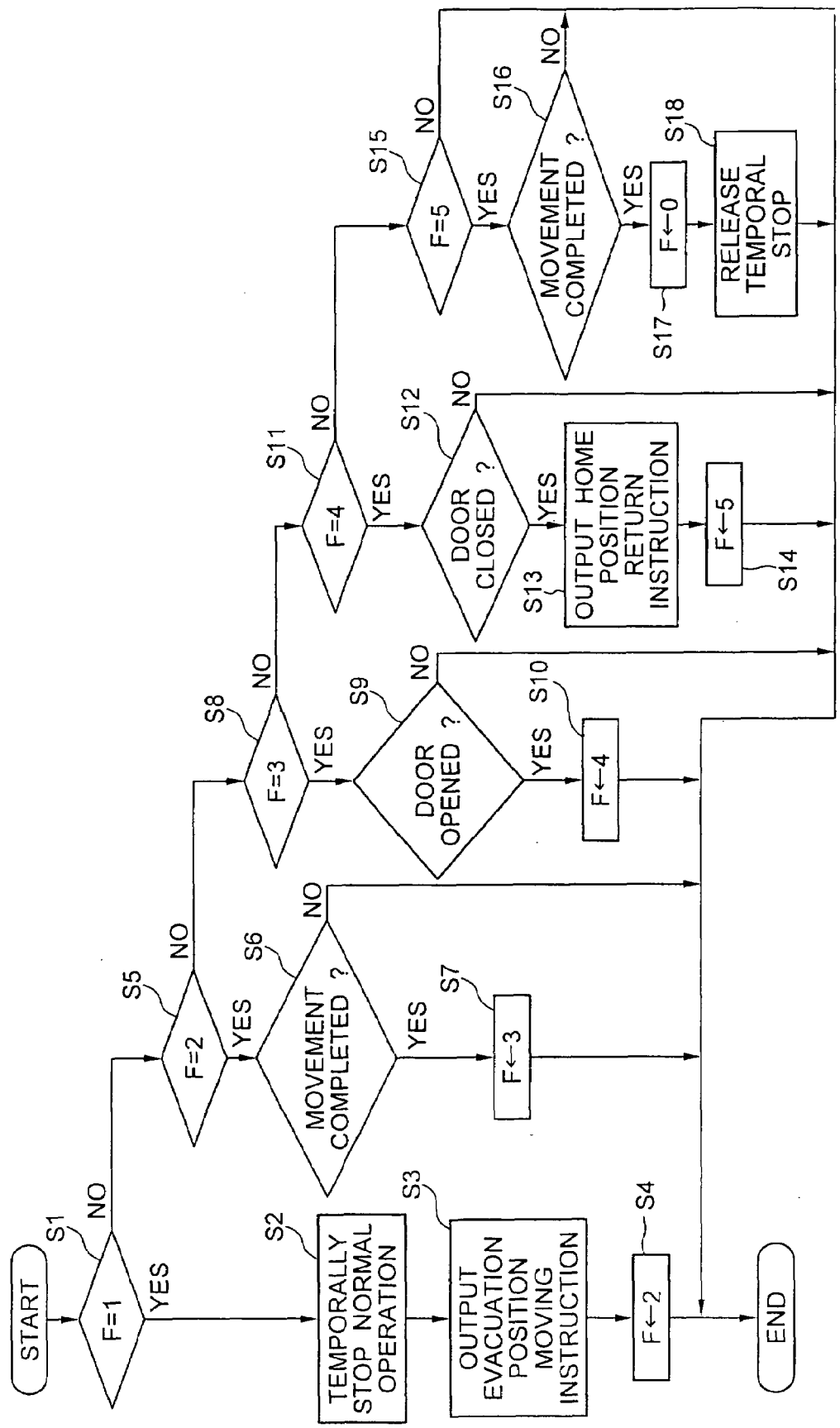

AUTOMATIC MEDIUM CHANGER WITH CARRIER-PRESSURE-OPERATED MECHANICAL AUTO LOCK/UNLOCK MECHANISM

BACKGROUND OF THE INVENTION

1. Field of the Invention

The present invention relates to improvements in an automatic medium changer, and in particular, to improvements in the automation of the lock/unlock mechanism of the door provided to the casing.

2. Related Art

An automatic medium changer, which is so configured as to selectively take an information storage medium out of multiple information storage media stored in the casing, and read/write data therefrom or thereto, has already been known.

By its nature, this kind of automatic medium changer includes, as essential requirements, a medium storing unit for storing multiple information storage media, a read/write unit for reading data from or writing data into the information storage media, and a carrier which reciprocates between the medium storing unit and the read/write unit while holding an information storage medium.

Since the information storage media stored in the casing are required to be exchanged with others of the outside, an openable door is provided to one surface of the casing. This permits an access to the medium storing unit from the outside.

However, if someone opens the door and put a hand into the casing when the carrier is moving between the medium storing unit and the read/write unit, a problem of the hand being caught in the operating carrier may be caused.

In order to solve such a disadvantage, some automatic medium changers, which are so configured as to prohibit inadvertent opening of the door when the carrier is moving, have been proposed.

For example, one that the door is locked using an electric actuator such as a solenoid to thereby prohibit an opening manipulation of the door when the carrier is moving, and one that an opening manipulation of the door by a hand itself is not prohibited, but by sensing the door being opened, a problem of a hand being caught or the like is prevented by forcibly stopping the movement of the carrier, have been known.

Further, one that the door is locked without using an electric actuator is disclosed in, for example, the Japanese Utility Model Application Laid-open No. 64-35544. In this publication, a cassette transferring device is proposed, which is so configured as to permit a cassette to be fed by releasing the lock of the open-close cover when the cassette feeding mechanism is activated, and the open-close cover is locked when the cassette feeding mechanism is inactivated. However, this only prevents an accident caused by the open-close cover being opened in the state of no cassette, and is not provided with a function of locking the open-close cover when the cassette feeding mechanism is activated.

However, a configuration, in which the door is locked using an electric actuator such as a solenoid, causes a problem that the manufacturing cost becomes relatively high. Further, a configuration, in which the movement of the carrier is forcibly stopped, may cause such problems as damages or overloads to the device by the forced stopping manipulation.

SUMMARY OF THE INVENTION

It is an object of the present invention to provide an automatic medium changer which is free of the defects in the aforementioned conventional technique and is surely capable of preventing a door being opened when a carrier is moving, without using an electric actuator and without imposing a burden on the device.

The present invention is an automatic medium changer comprising, in a casing having an openable door: a medium storing unit for storing a plurality of information storage media; a read/write unit for reading data from and writing data into the information storage media; a carrier which reciprocates between the medium storing unit and the read/write unit while holding the information storage medium. In order to achieve the aforementioned object, the present invention has the structure which particularly includes: a lock mechanism which is capable of locking the door to the casing so as not to be openable; and a mechanical auto lock/unlock mechanism for detecting the carrier being located at the evacuation position and causing the lock mechanism to be in the unlocked state, while detecting the carrier having moved from the evacuation position to the normal operational area and causing the lock mechanism to be in the locked state.

By mechanically constituting the auto lock/unlock mechanism which switches the lock mechanism between the unlocked state and the locked state, an electric actuator such as a solenoid is not required, whereby it is possible to provide an automatic medium changer having the auto lock/unlock mechanism at a low price.

Further, when the carrier is moving within the normal operational area, the lock mechanism is kept in the locked state and the opening manipulation of the door is completely prohibited. Therefore, there is no need to forcibly stop the carrier coping with an inadvertent opening manipulation of the door, so that the problems of damages or overloads to the device can be solved.

More specifically, the lock mechanism can be composed of, for example, an engagement portion formed on the door and a lock pin provided in the casing. The auto lock/unlock mechanism can be composed of an elastic urging means for urging the lock pin in a direction that a tip portion of the lock pin engages with the engagement portion, and a lever for moving the lock pin in a direction of disengaging the tip portion of the lock pin from the engagement portion. In this structure, the lever is disposed at a position where the lever is operated by a pressure applied by the carrier moving from the normal operational area to the evacuation position.

In the case of applying these structures, the locked state of the door to the casing is kept by the engagement of the engagement portion formed on the door and the lock pin provided in the casing. Since the lock pin is urged by the elastic urging means in a direction of engaging the tip portion of the pin with the engagement portion, there is no need to concern that the lock pin unintentionally disengages the engagement portion whereby the door opens when the carrier is moving within the normal operational area.

Further, when the carrier deviates from the normal operational area and moves to the evacuation position so as to be in the state where the door can be safely opened, the lever is pressed by the carrier moving from the normal operation area to the evacuation position. This lever forcibly moves the lock pin against the urging force of the elastic urging means, whereby the tip portion of the lock pin disengages the engagement portion of the door, so that the opening manipulation of the door is permitted.

Thus, the opening/closing manipulation of the door can be freely performed when the carrier is located at the evacuation position.

When the door is closed during the period of the carrier being located at the evacuation position whereby the carrier returns to the normal operational area again, the tip portion of the lock pin is automatically engages with the engagement portion of the door since the lock pin is urged by the elastic urging means. Thereby, the locked state of the door to the casing is kept again.

Here, the lever for moving the lock pin may be formed of a lever which oscillates with a pressure applied by the carrier to thereby move the lock pin, or of a linear movement member formed integral with the lock pin.

In particular, if the lever is formed of a linear movement material formed integral with the lock pin, the overall structure of the device is simplified, which provides an advantage in reducing the manufacturing cost.

The lock mechanism may comprise an engagement portion formed on the door and a stopping pawl formed on one end of an oscillation lever provided in the casing. The auto lock/unlock mechanism may comprise an elastic urging means rotationally urging the oscillation lever in a direction of engaging the stopping pawl with the engagement portion, and a pressure receiving portion located on the oscillation lever which, by receiving a force from an outside, oscillates the oscillation lever in a direction of disengaging the stopping pawl from the engagement portion.

The oscillation lever is disposed at a position where the pressure receiving portion is pressed by the carrier moving from the normal operational area to the evacuation position.

In the case of applying these configurations, there are advantages in simplifying the structures of the lock mechanism and the auto lock/unlock mechanism and in reducing the number of the parts, since the oscillation lever and the stopping pawl are integrally formed.

In the case of applying these configurations, the locked state of the door to the casing is kept by the engagement of the engagement portion formed on the door and the stopping pawl of the oscillation lever provided in the casing. The oscillation lever is rotationally urged by the elastic urging means in a direction of engaging the stopping pawl with the engagement portion. Therefore, there is no need to concern that the stopping pawl unintentionally disengages the engagement portion whereby the door opens, when the carrier is moving within the normal operational area.

When the carrier deviates from the normal operational area and moves to the evacuation position so as to be in the state where the door can be safely opened, the pressure receiving portion of the lever is pressed by the carrier moving from the normal operation area to the evacuation position. Then, the lever, in which the pressure receiving portion is pressed, oscillates in a direction of disengaging the stopping pawl from the engagement portion against the rotational urging force of the elastic urging means, whereby the stopping pawl disengages the engagement portion of the door, so that the opening manipulation of the door is permitted.

Thus, the opening/closing manipulation of the door can be freely performed when the carrier is located at the evacuation position.

When the door is closed during the period of the carrier being located at the evacuation position whereby the carrier returns to the normal operational area again, the stopping pawl of the lever automatically engages with the engagement portion of the door since the oscillation lever is rotationally urged by the elastic urging means. Thereby, the locked state of the door to the casing is kept again.

Further, the lever may be provided with an emergency manipulation portion with which the lever is moved against an urging force applied by the elastic urging means, and the casing may be provided with a small hole perforated for manipulating the emergency manipulation portion from an outside.

In the case of applying these configurations, it is possible to forcibly unlock the lock mechanism to thereby open the door even when a movement of the carrier to the evacuation position is disturbed by a failure of the device or a bad feeding of an information storage medium in the medium storing unit or the read/write unit.

As the elastic urging means, a coil spring or a helical torsion spring may be used.

In a case of using a coil spring, the device can be miniaturized by mounting the coil spring to the lock pin in an outside engagement, and in a case of using a helical torsion spring, it can be miniaturized by mounting the bending portion of the helical torsion spring to the oscillation center of the lever in an outside engagement.

Further, the automatic medium changer may be configured in such a manner that in the casing, an unlock switch for requesting the lock mechanism to unlock, an open/close state detecting sensor for confirming an open/close state of the door, and a controller for controlling the driving source of the carrier are arranged in juxtaposition. The controller may be provided with an evacuation instruction output means which, upon receipt of an unlock signal from the unlock switch, outputs to the driving source an evacuation position moving instruction, and a return instruction output means which, when confirming that a door opening confirmation signal and a door closing confirmation signal from the open/close state detecting sensor are received in this order, outputs to the driving source a home position return instruction.

In the case of applying these configurations, first, when the user manipulates the unlock switch, an unlock signal is output from the unlock switch to the controller.

The controller, upon receipt of the unlock signal, operates the evacuation instruction output means so as to output an evacuation position moving instruction to the driving source of the carrier, to thereby operates the driving source so as to move the carrier from the current position to the evacuation position.

Thereby, the lock mechanism is in the unlocked state, so that an opening manipulation of the door by the user is permitted.

When the user actually opens the door, the open/close state detecting sensor detects the door opening, and outputs a door opening confirmation signal to the controller.

Then, when the user performs necessary steps, for example, performing an exchange of an information storage medium to the medium storing unit in the state of the door being opened, and then closes the door, the open/close state detecting sensor detects the door being closed, and outputs a door closing confirmation signal to the controller.

The controller confirms the door being closed upon receipt of the door closing confirmation signal following the door opening confirmation signal, and operates the return instruction output means to thereby output a home position return instruction to the driving source of the carrier, and then moves the carrier from the evacuation position to the home position within the normal operational area.

Thus, the carrier is permitted to move from the evacuation position only in the state that the engagement portion of the door and the lock pin or the stopping pawl can accurately engage with each other. Therefore, it is possible to reliably ensure the locked state of the door to the casing.

Further, the function of the controller may be served by a control unit for drive-controlling the automatic medium changer as a whole.

Since the function of the controller is realized by task processing performed by the CPU in the control unit, it is possible to provide an automatic medium changer which does not need a dedicated control means, at a low price.

Further, the evacuation position of the carrier is preferably set at a position outside a space formed between the door and the medium storing unit.

Since the opening of the door is permitted while the carrier stops at the position outside the space formed between the door and the medium storing unit, it is possible to perform a smooth operation such as an exchange of an information storage medium to the medium storing unit without being disturbed by the carrier.

BRIEF DESCRIPTION OF THE DRAWINGS

FIG. 10 is a flowchart showing tasks of door opening/closing processing which is repeatedly performed in predetermined cycles by the CPU serving as a controller for controlling a motor which is the driving source of the carrier.

PREFERRED EMBODIMENTS OF THE INVENTION

Several embodiments of the present invention will be described in detail below with reference to the drawings.

Figure 1:
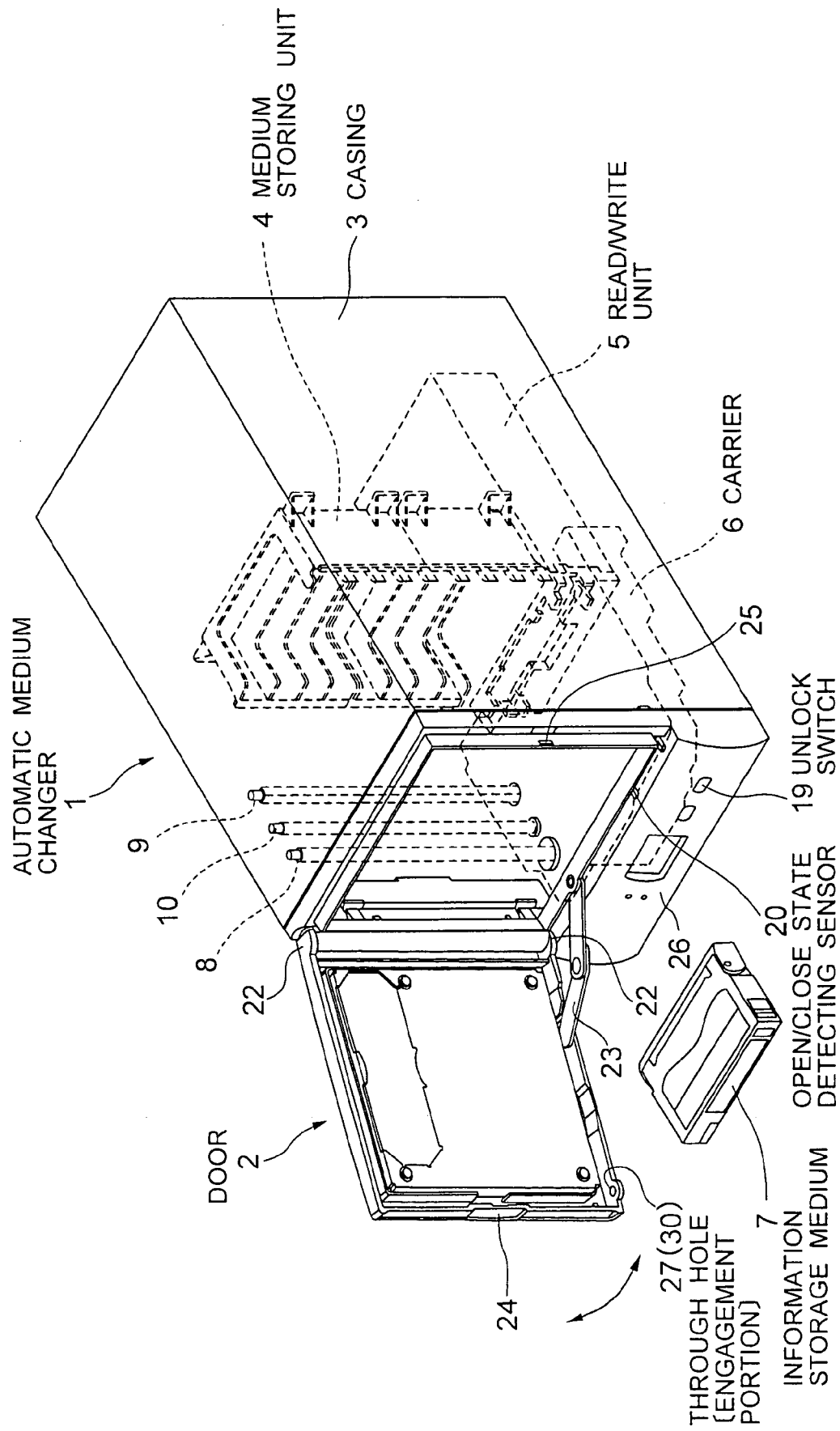
FIG. 1 is an oblique perspective view showing the schematic structure of an automatic medium changer of an embodiment according to the present invention.

The main part of an automatic medium changer 1 of an embodiment comprises, a casing 3 having an openable door 2, a medium storing unit 4 arranged inside the casing 3, a read/write unit 5, and a carrier 6, as shown in FIG. 1.

Figure 2:
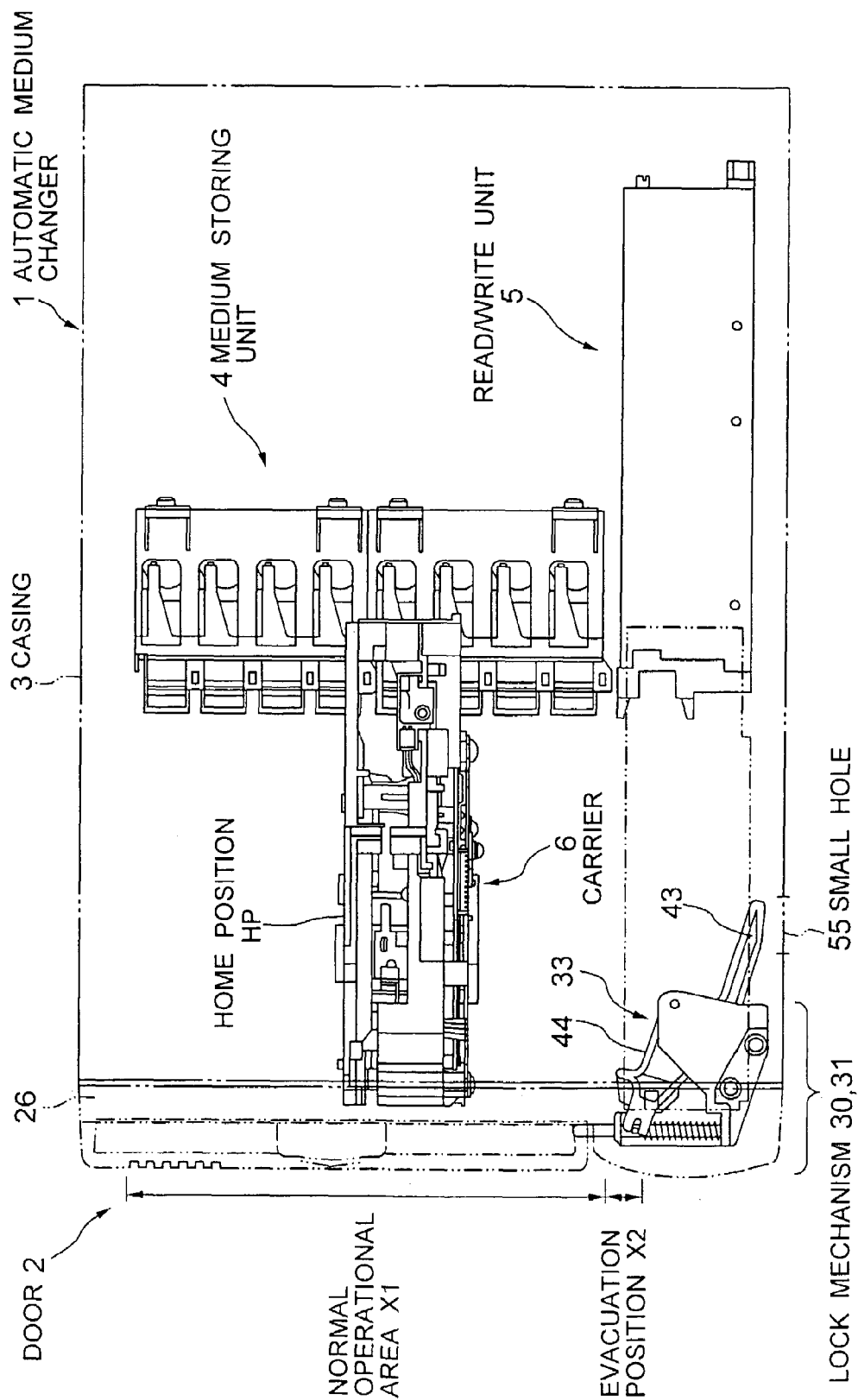
FIG. 2 is a perspective view, taken from a side, showing the schematic structure of the automatic medium changer of the embodiment.

The medium storing unit 4 is formed of several storing cells connected above and below so as to store multiple information storage media 7, as shown in FIGS. 1 and 2.

Further, the read/write unit 5 is arranged below the medium storing unit 4 so as to overlap with the medium storing unit 4 above and below.

The carrier 6 is mounted to be movable in the up and down direction along the medium storing unit 4 and the read/write unit 5, and has a function of loading/correcting the information storage media 7 to and from each storing cell of the medium storing unit 4 and the read/write unit 5.

The traveling of the carrier 6 in the up and down direction is achieved by rotationally driving a feed screw 8 such as a lead screw or a ball screw by a motor M1 (see FIG. 4) which is the driving source incorporated in the casing 3, to thereby give a feed to a nut or a ball socket fixed onto the carrier 6.

Further, the operation of loading/correcting the information storage media 7 is achieved by rotationally driving a power transmission shaft 9, formed in a prism shape, by a motor M2 (see FIG. 4) incorporated in the casing 3, transmitting the torque to a gear on the carrier 6, to thereby drive a conveying roller, a conveying belt, a pickup hand or the like disposed in the carrier 6. In the central portion of the gear, on the carrier 6, engaging with the power transmission shaft 9, a rectangle hole is perforated. This hole is splined to the power transmission shaft 9, whereby the transmission of the torque and the vertical movement of the carrier 6 as a whole including the gear can be permitted.

Note that the reference numeral 10 in FIG. 1 represents a guiding rod, which restricts a direction of the vertical movement of the carrier 6 together with the aforementioned feed screw 8 and the power transmission shaft 9.

The read/write unit 5 has a function of reading data from and writing data into the information storage medium 7 received from the carrier 6.

As for the structures of the medium storing unit 4, the read/write unit 5 and the carrier 6, several types have already been known, and the structures themselves are not directly related to the present invention. Therefore, their detailed explanations are omitted.

Figure 4:
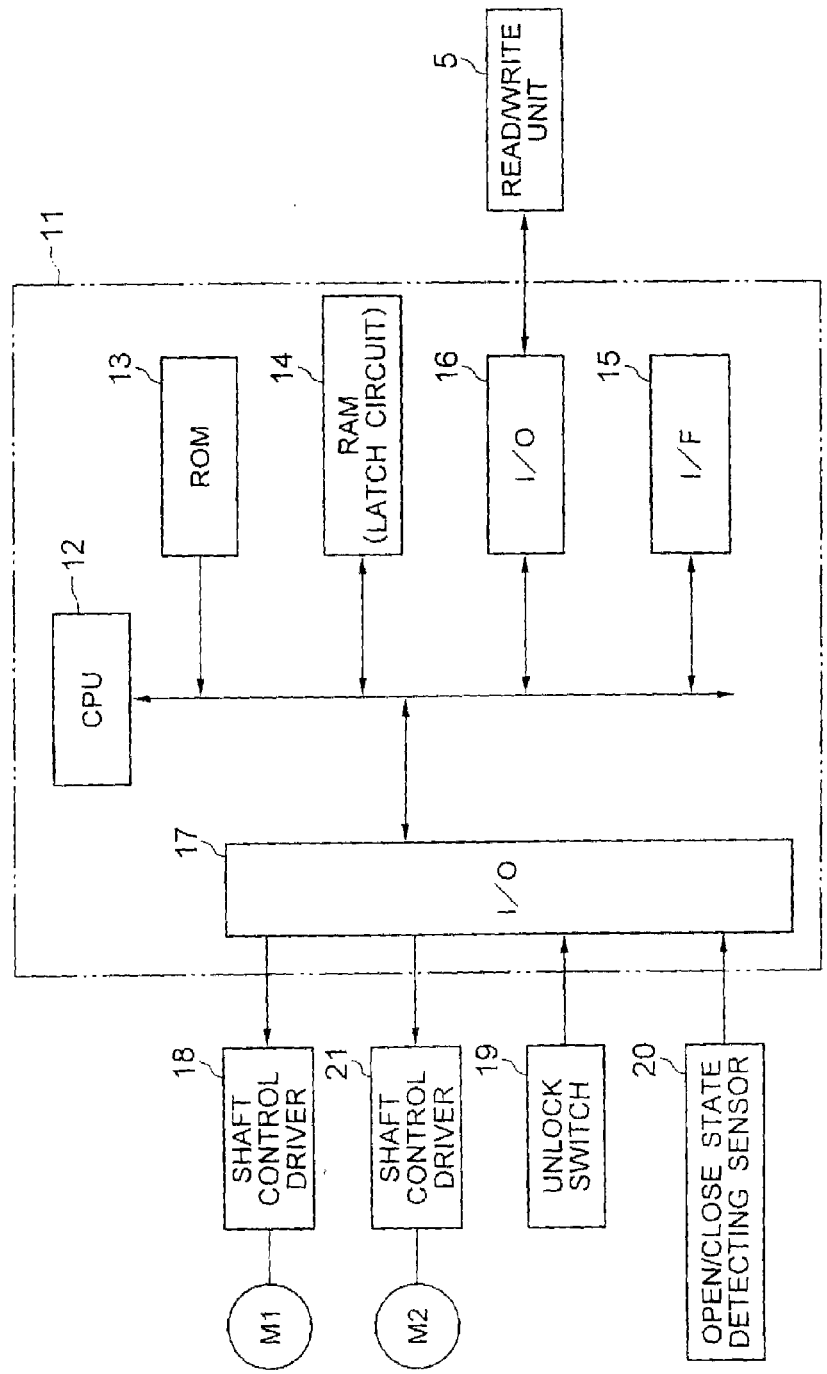
FIG. 4 is a functional block diagram showing the schematic structure of a control unit for drive-controlling the automatic medium changer, as a whole, of the embodiment.

FIG. 4 is a functional block diagram showing the schematic structure of a control unit 11 for drive-controlling the automatic medium changer 1 as a whole.

As shown in FIG. 4, the control unit 11 includes, a CPU 12 as a computing means, a ROM 13 for storing a controlling program or the like, a RAM 14 used for temporarily storing computing data, an interface 15 for connecting with an upper device, among others, a personal computer, an I/O circuit 16 for inputting and outputting data with the read/write unit 5, and an I/O circuit 17 for inputting and outputting signals with a sensor and each controlling object.

Since the inputting/outputting of data performed between the control unit 11 and the read/write unit 5, and between the control unit 11 and the upper device is a typical function, the explanation is omitted. Here, an explanation will be restrictedly given to an electric connecting relationship among the elements required for the CPU 12, in the control unit 11, serving as a controller for drive-controlling the motor M1 which is the driving source of the carrier 6.

As described above, the motor M1 is the driving source for moving the carrier 6 in the vertical direction, and is drive-controlled by instructions from the CPU 12 via the I/O circuit 17 and a shaft control driver 18.

Further, an unlock signal from an unlock switch 19 (see FIG. 1) provided to the front panel 26 of the casing is monitored by the CPU 12 via the I/O circuit 17. The CPU, upon detection of the unlock signal from the unlock switch 19, sets a value 1 to a state storing flag F in the RAM 14.

Further, on a surface of the front panel 26 contacting with the door 2, there is provided an open/close state detecting sensor 20 (see FIG. 1) for confirming the open/close state of the door 2, whereby a door opening confirmation signal or a door closing confirmation signal from the sensor 20 is read into the CPU 12 via the I/O circuit 17.

The motor M2 serves to drive the conveying roller, the conveying belt, the pickup hand or the like in the carrier 6 to thereby load or correct the information storage medium into or from the medium storing unit 4 or the read/write unit 5. As same as the aforementioned motor M1, the motor M2 is drive-controlled by an instruction from the CPU via the I/O circuit 17 and the shaft control driver 21.

Next, the mounting structure of the door 2 to the casing 3, the structures of the lock mechanism for locking the door 2 to the casing 3, and the auto lock/unlock mechanism for manipulating the lock mechanism will be explained in detail.

As shown in FIG. 1, the door 2 is, via hinges 22, 22 provided to the top and the bottom of one side thereof, openably mounted at the front of the front panel 26 of the casing 3. The opening limit is restricted by a foldable link 23. On the other side of the door 2, a notch 24 for opening/closing manipulation is provided. Through the engagement of the notch 24 and a latch mechanism 25 of the side of the front panel 6, the closing state of the door 2 is ensured with a certain degree of resistance in the state of the door 2 being closed, though this is not limited to the lock mechanism composed of the notch 24 and latch mechanism 25.

Figure 3:
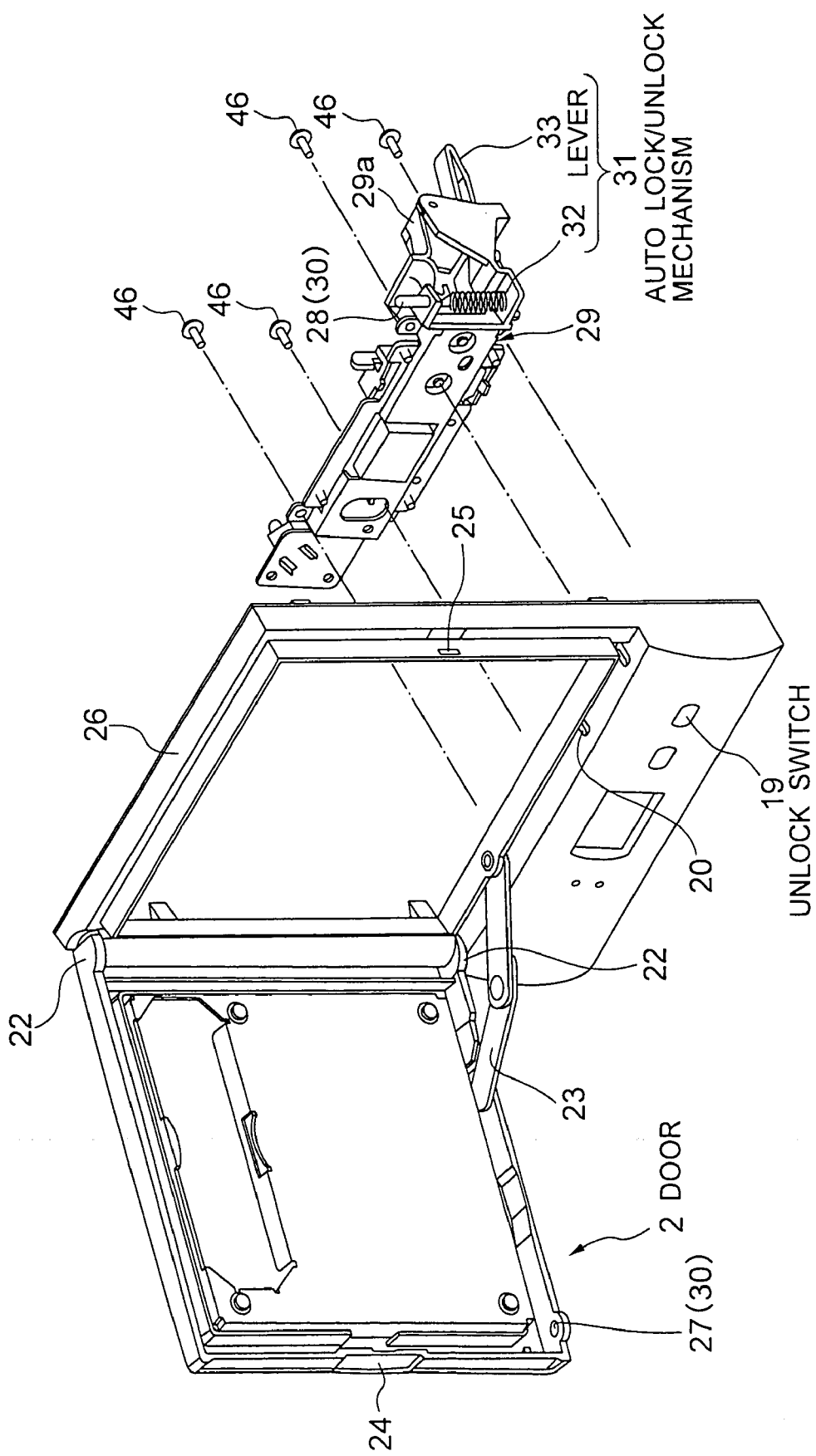
FIG. 3 is a perspective view showing by taking out the surrounding structure of the door of the automatic medium changer of the embodiment.

The lock mechanism 30 in the present embodiment is composed of, a through hole 27 in the bottom surface of the door 2 constituting the engagement portion of the door 2 side, and a lock pin 28 provided to the back surface of the front panel 26 via a stay 29, as shown in FIG. 3. Further, the auto lock/unlock mechanism 31 in the present embodiment is composed of a coil spring 32 serving as an elastic urging means for urging the lock pin 28, and a lever 33 for moving the lock pin 28.

Figure 5:
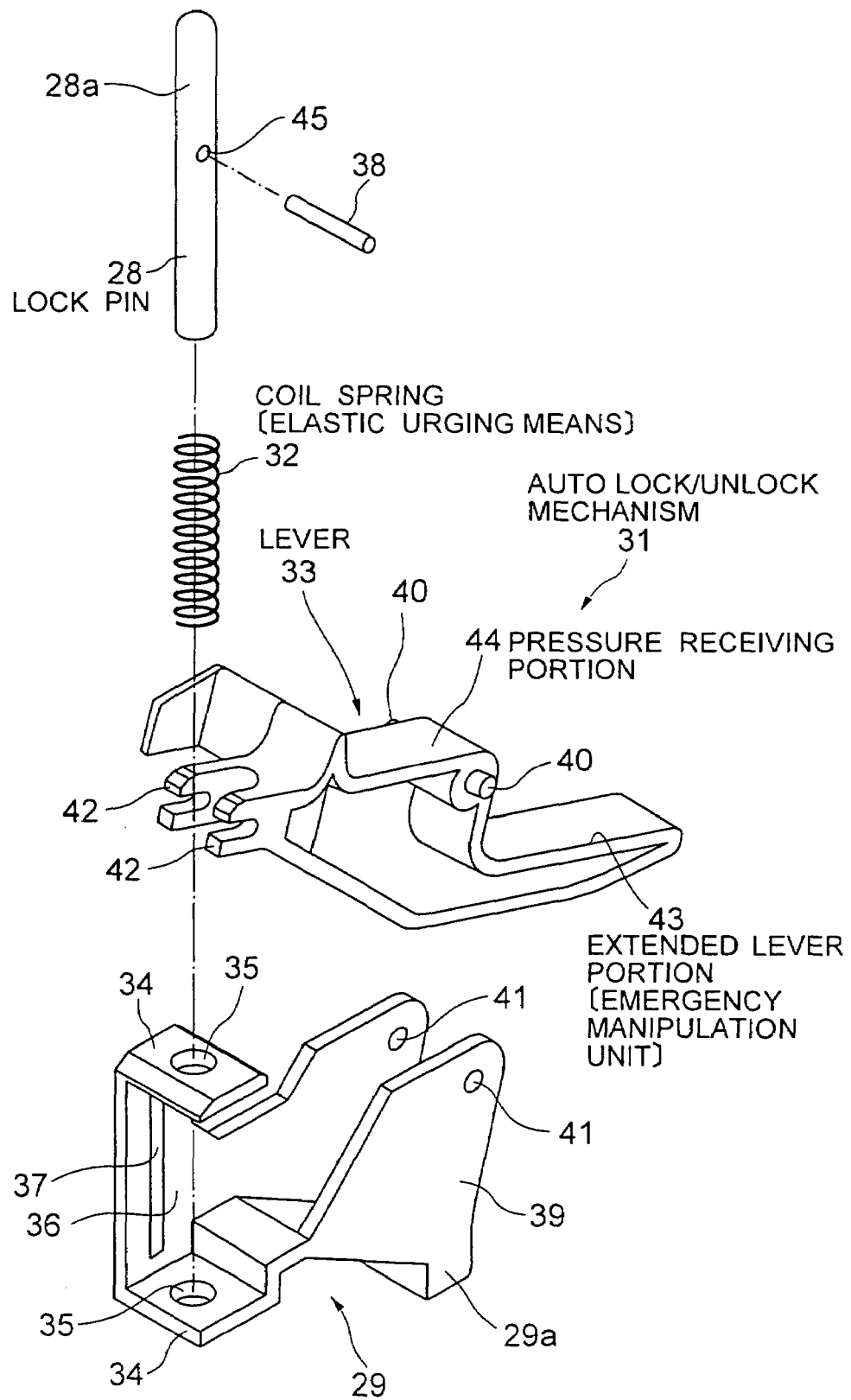
FIG. 5 is an assembly diagram showing the structure of the auto lock/unlock mechanism of the automatic medium changer of the embodiment.
Figure 6:
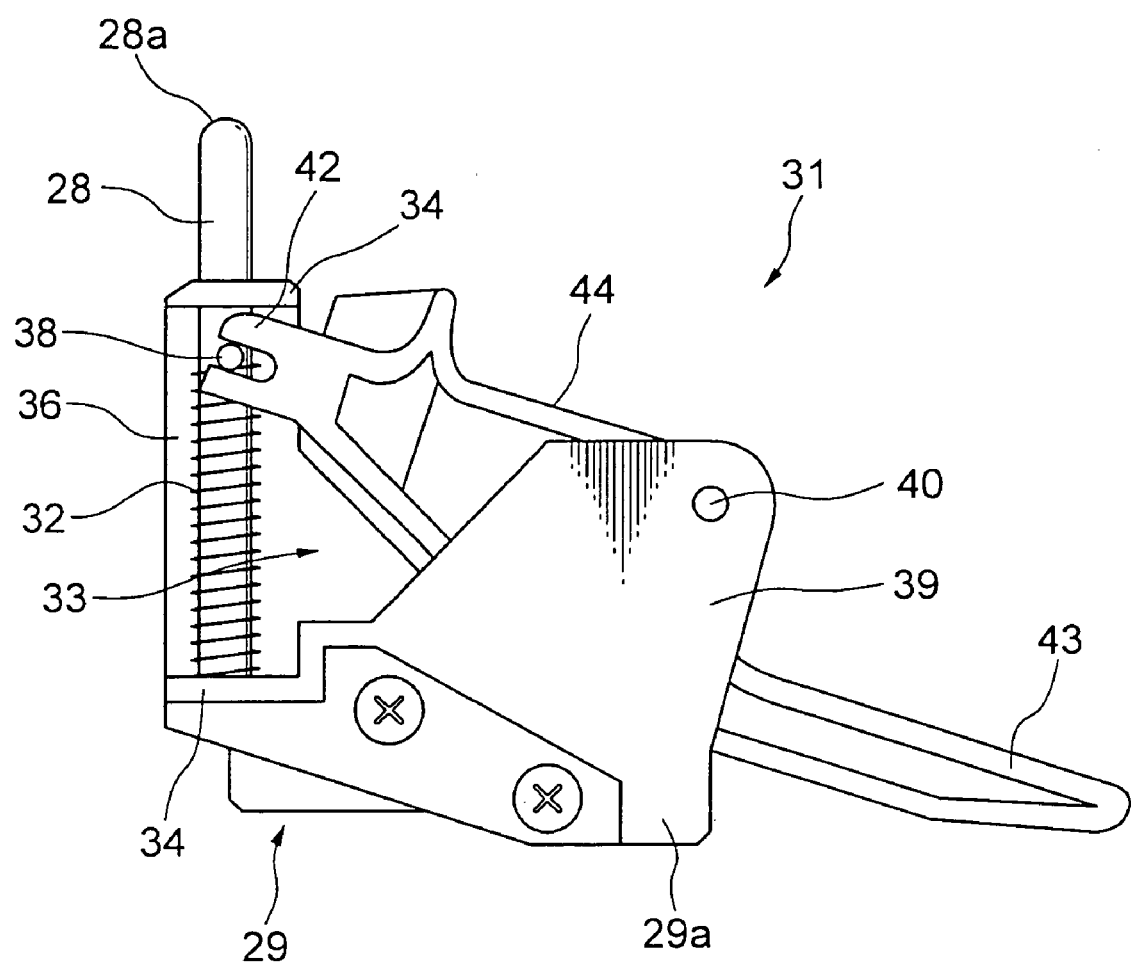
FIG. 6 is a side view showing in detail a part of a lock mechanism and the auto lock/unlock mechanism of the automatic medium changer of the embodiment.

FIG. 5 is an assembly diagram showing in detail the structure of the auto lock/unlock mechanism 31, and FIG. 6 is a side view showing a part of the lock mechanism 30 and the auto lock/unlock mechanism 31.

As shown in FIG. 5, the stay 29 is so formed that lock pin mounting pieces 34, 34, for allowing the lock pin 28 to penetrate therethrough and to be supported movably in the vertical direction, are integrally formed with a part mounting portion 29a constituting the main portion of the stay 29, and the lock pin 28 penetrates, with a play, the through holes 35, 35 perforated in the central portions of the lock pin mounting pieces 34, 34.

Further, in the side plate 36 of the part mounting portion 29a, a slit 37 is perforated, which guides, in the state movable in the vertical direction, the engagement pin 38 pressed-in along with the lock pin 28 being inserted in a diameter direction.

Further, in the side plates 36, 39 of the both sides of the part mounting portion 29a, through holes 41, 41 for journaling the columnar protrusions 40, 40 formed on both sides of the lever 33 are perforated. Through these through holes 41, 41, the lever is mounted to be capable of oscillation.

On the tip portion of the lever 33, approximately U-shaped, engaging recesses 42, 42 are integrally formed. The engaging recesses 42, 42 transmit an oscillation of the lever 33 to the lock pin 28 via the engagement pin 38, while converts the oscillation into a linear movement in the vertical direction. On the other end of the lever 33, an extended lever portion 43 serving as an emergency manipulation unit is integrally formed.

On the upper surface located slightly closer to the tip than the columnar protrusions 40, 40 being the oscillation center of the lever 33, a pressure receiving portion 44 pressed by the bottom surface of the carrier 6 is integrally formed.

In assembling the auto lock/unlock mechanism 31, first, the coil spring 32 is properly compressed so as to be positioned between the top and bottom lock pin mounting pieces 34, 34, and then the lock pin is inserted into the through holes 35, 35 of the lock pin mounting pieces 34, 34 and the coil spring 32.

Next, the engagement pin 38 is pressed into the pin hole 45 perforating the lock pin 28 in the diameter direction, both ends of the engagement pin 38 are made protruded from the outer periphery of the lock pin 28 so as to support the top edge of the coil spring 32, while one side of the engagement pin 38 protruded from the lock pin 28 is inserted into the slit 37 of the side plate 36.

Then, while keeping the state that the both ends of the engagement pin 38, protruded from the lock pin 28 in the diameter direction, engage with the engaging recesses 42, 42 of the lever 33, the side plates 36, 39 of the part mounting portion 29a is expanded with a push to be elastically deformed, whereby the lever 33 is inserted in between the side plates 36 and 39, the columnar protrusions 41, 41 of the lever 33 engage in the through holes 41,41 of the side plates 36, 39, and the lever 33 is journaled to be capable of oscillation.

FIG. 6 shows the auto lock/unlock mechanism 31 which has been assembled. As shown in FIG. 6, the coil spring 32 serving as an elastic urging means steadily urges the lock pin 28 in the upward direction via the engagement pin 38.

The present embodiment has such a structure that the tip portion 28a of the lock pin 28 protruding upward enters into the through hole 27 which is the engagement portion of the door 2, to thereby lock the door 2 so as to be in the unopenable state. Therefore, urging the lock pin 28 in the upward direction, and urging the lock pin 28 in a direction of engaging the tip portion 28a of the lock pin 28 with the engagement portion of the door 2, have the same meanings.

Although FIG. 6 shows a posture of each portion in the initial state where the lever 33 is inactivated, if, from this state, the lever 33 is oscillated in a counterclockwise direction with reference to the columnar protrusions 40, 40, the engaging recesses 42, 42 of the lever 33 pushes down the engagement pin 38 downward against the elastic force of the coil spring 32, whereby the lock pin 28 moves downward and the tip portion 28 thereof is removed downwardly from the through hole 27 which is the engagement portion of the door 2.

Since the coil spring 32 is mounted on the lock pin 28 in an outside engagement by coiling it, no specific space is required to dispose an urging means, whereby a compact device design can be achieved.

As shown in FIG. 3, this auto lock/unlock mechanism 31 is mounted on the back surface of the front panel 26 using four machine screws 46 for fixing the stay 29 onto the back surface of the front panel 26.

The mounting position of the auto lock/unlock mechanism 31 viewed from a side of the casing 3 is shown in FIG. 2.

This auto lock/unlock mechanism 31 is arranged at such a position that the bottom surface of the carrier 6 does not contact the pressure receiving portion 44 of the lever when the carrier 6 moves within the normal movement area X1 but the bottom surface of the carrier 6 presses the pressure receiving portion 44 of the lever 33 when the carrier deviates from the normal operational area X1 and falls down to the evacuation position X2.

It should be noted that the normal operational area X1 referred herein means a moving area when the carrier 6 loads/corrects the information storage medium 7 to/from the medium storing unit 4 or the read/write unit 5, and the evacuation position X2 means a position lower than the position where the carrier 6 loads/corrects the information storage medium 7 to/from the medium storing unit 4 or the read/write unit 5.

In FIG. 2, the central position in the vertical direction of the medium storing unit 4 is defined as the home position HP of the carrier 6. Practically, however, the home position HP may be at any place within the range included in the normal operational area X1.

Now, several other embodiments related to the structure of the auto lock/unlock mechanism will be briefly explained with reference to FIGS. 7 to 9.

Figure 7:
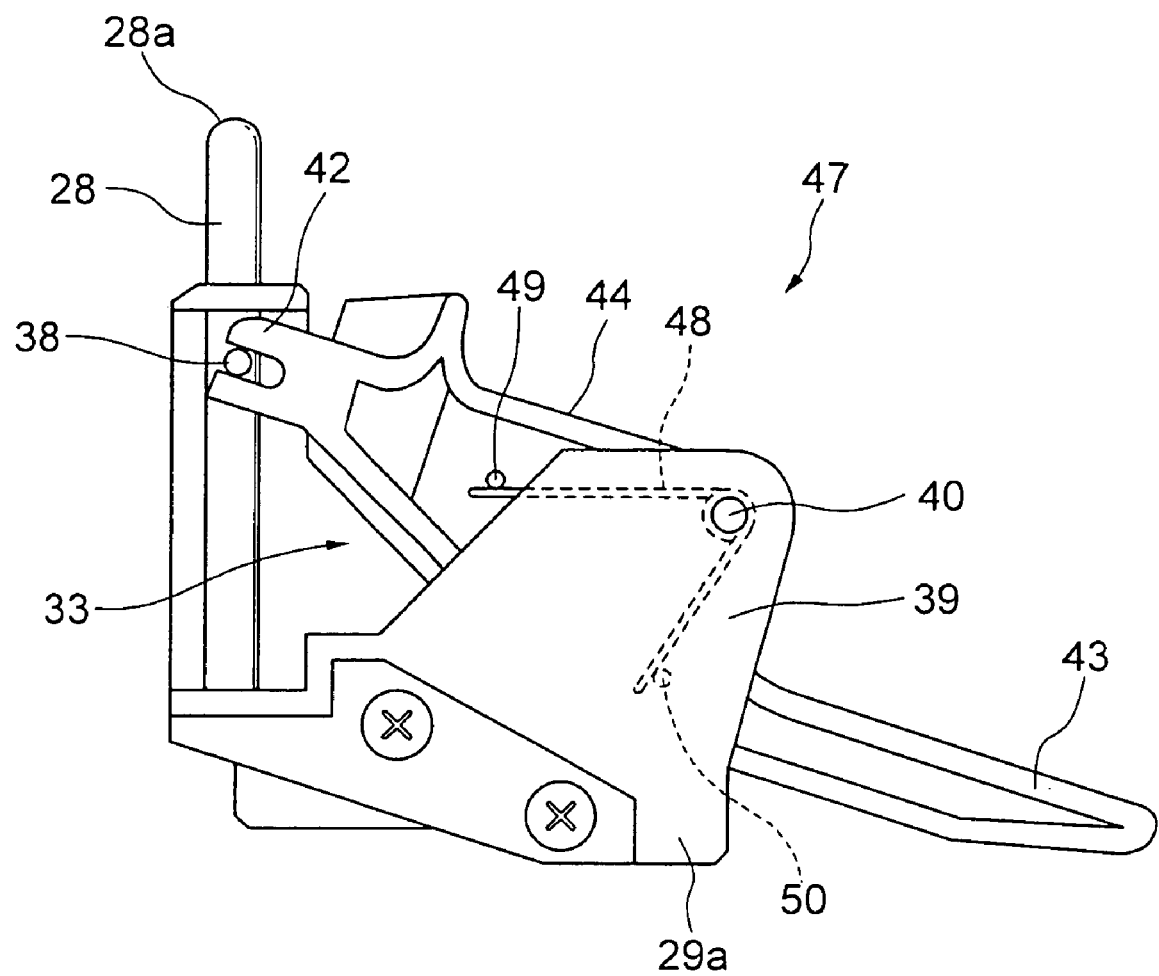
FIG. 7 is a side view showing an example of the auto lock/unlock mechanism using, instead of a coil spring, a helical torsion spring as an elastic urging means.

An auto lock/unlock mechanism in FIG. 7 uses a helical torsion spring 48 as an elastic urging means substituted for the coil spring. The bent portion of the helical torsion spring 48 is supported by the columnar protrusion 40 which is the center of the oscillation of the lever 33. One end of the helical torsion spring 48 is pushed against a stopper 49 on the lever 33, while the other end of the helical torsion spring 48 is pushed against a stopper 50 formed on the inner side of the side plate 39. Thus, the elastic urging force of the helical torsion spring 48 steadily urges the lever 33 to oscillate in a clockwise direction in FIG. 7. Since the helical torsion spring 48 is mounted in such a manner that the loop of the bent portion engages at the outside with the columnar protrusion 40 which is the center of the oscillation of the Lever 33, any specific space to arrange an urging means is not required, whereby a compact device design is possible. Other structures are same as that of the auto lock/unlock mechanism 31 shown in FIGS. 5 and 6.

Figure 8:
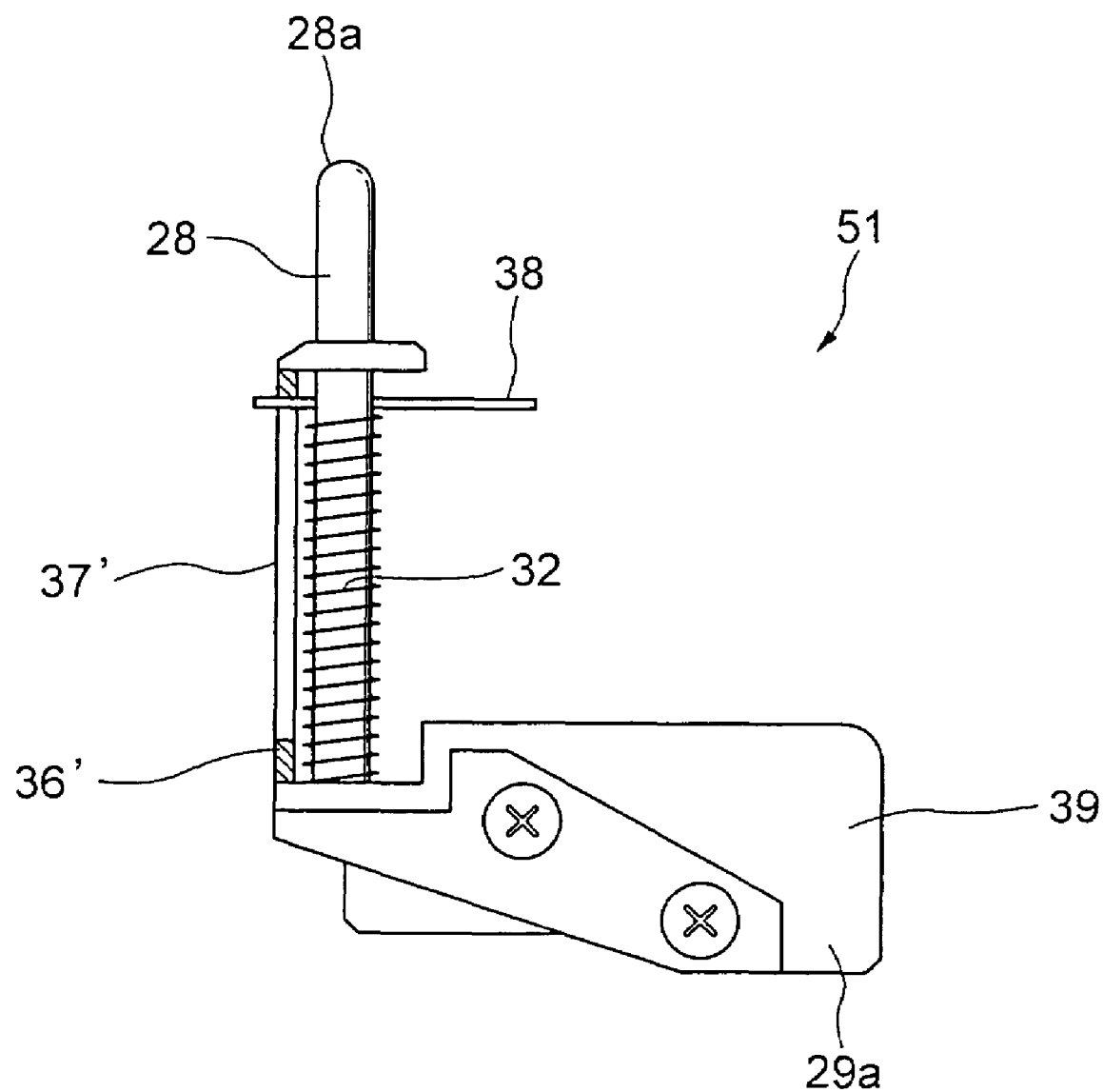
FIG. 8 is a side view showing an example of the auto lock/unlock mechanism using an engagement pin as a lever and a pressure receiving portion.

An auto lock/unlock mechanism 51 shown in FIG. 8 is intended to simplify the structure and reduce the number of the parts. A long engagement pin 38 pressed into the lock pin 28 has both functions of the lever 33 and the pressure receiving portion 44 in the embodiment shown in FIGS. 5 and 6. That is, in this embodiment, the engagement pin 38 is a liner movement member which is integrally formed with the lock pin 28. The part mounting portion 29a of the stay 29 is provided with a front plate 36' substituted for the side plate 36 in FIGS. 5 and 6. One end of the engagement pin 38 is engaged in a slit 37' perforated in the front plate 36', to thereby prevent unintentional rotating operation of the engagement pin 38. When the engagement pin 38 is pressed downward, the lock pin 28 is pressed downward against the elastic force of the coil spring 32, and the tip portion 28a thereof is removed downward from the through hole 27 which is the engagement portion of the door 2. Therefore, the engagement pin 38 has substantially the same function as that of the lever 33 and the pressure receiving portion 44 of the embodiment shown in FIGS. 5 and 6.

Figure 9:
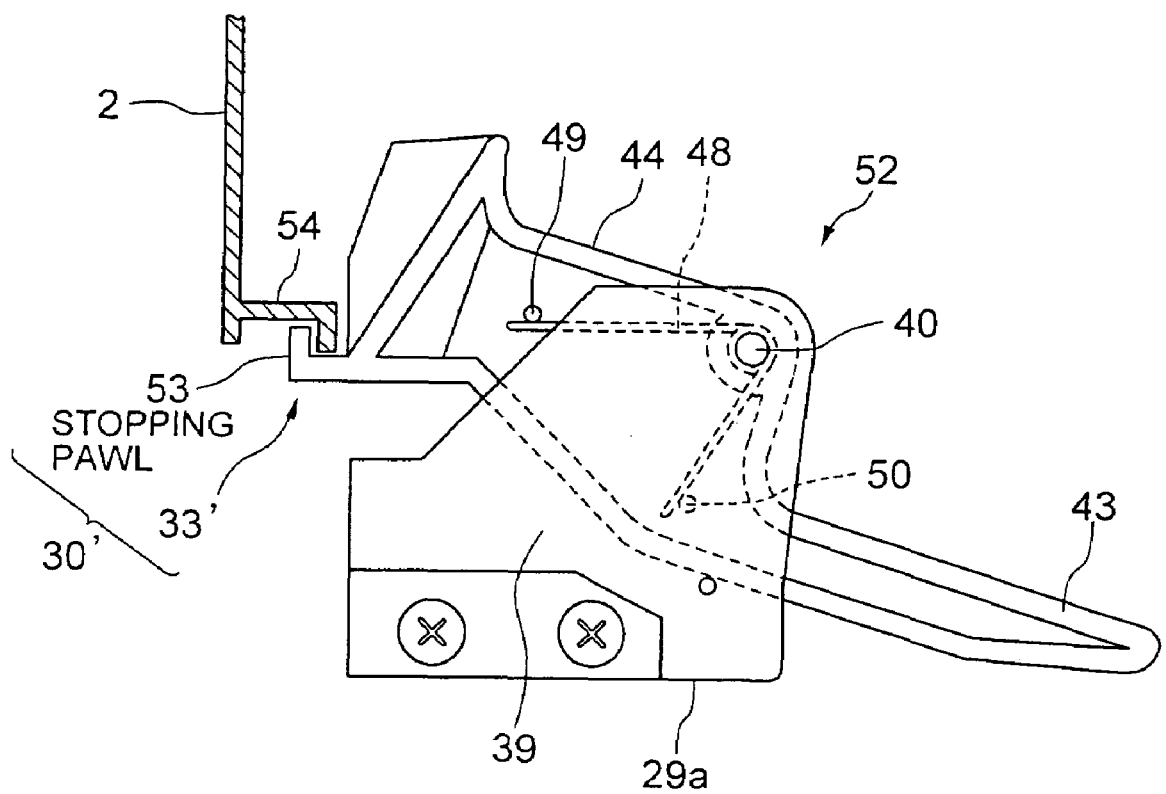
FIG. 9 is a side view showing an example of the lock mechanism using a stopping pawl as an oscillation lever and the auto lock/unlock mechanism using the coil spring as an elastic urging means.

An auto lock/unlock mechanism 52 shown in FIG. 9 has an oscillation lever 33' substituted for the lever 33 of the embodiment in FIGS. 5 and 6, and a stopping pawl 53 is formed integrally to the tip portion of the oscillation lever 33'. Thus, a lock mechanism 30' of the embodiment shown in FIG. 9 is formed of an approximately L-shaped engagement portion 54 formed integrally on the back surface of the door 2, and the stopping pawl 53 of the oscillation lever 33'. In this embodiment, the point of using the helical torsion spring 48 as an elastic urging means is same as that of the embodiment shown in FIG. 7. This helical torsion spring 48 urges the oscillation lever 33' to oscillate in a clockwise direction in FIG. 9, that is, a direction where the stopping pawl 53 engages with the engagement portion 54 of the door 2. Further, the oscillation lever 33' is provided with a pressure receiving portion 44 same as that of the embodiment shown in FIGS. 5 and 6, that is, a means for oscillating the oscillation lever 33' in a direction of the stopping pawl 53 disengaging the engagement portion 54 by receiving an external force.

Next, with reference to a flowchart in FIG. 10 and a function block diagram in FIG. 4, operations of the lock mechanism 30 and the auto lock/unlock mechanism 31 of the automatic medium changer 1 shown in FIGS. 1 to 6 will be explained.

Here, the operation of the automatic medium changer 1 applying the auto lock/unlock mechanism 31 in FIGS. 5 and 6 is explained as an example. However, the practical operations in cases of using the auto lock/unlock mechanism 47 of FIG. 7, the auto lock/unlock mechanism 51 of FIG. 8, and the auto lock/unlock mechanism 52 of FIG. 9 are completely the same.

Processing shown in FIG. 10 is one of task processing that the CPU 12, serving as a controller for controlling the motor M1 which is the driving source of the carrier 6, repeats in predetermined cycles.

Since the CPU 12 is required to control the automatic medium changer 1 as a whole, it performs various such other processing as transferring data with an upper device, reading/writing data from/into the read/write unit 5, and drive-controlling the motor M2, corresponding to a value of the scanning counter selecting a task or an input of an interrupt signal. Each of them is processed within the range of an independent task. Therefore, explanations about processing related to the data transfer and the data reading/writing are omitted, and only the task of drive-controlling the motor M1 (hereinafter referred to as door open/close processing), which is directly related to the present invention, will be explained herein.

The CPU, when starting the door open/close processing, first accesses the RAM 14 to judge what value the current value of the state storing flag F takes among 0 through 5 (steps S1, S5, S8, S11 and S15).

Since the value of the state storing flag F is reset to 0 in the initialization processing when the power turns on, the value is kept at the initial value 0 unless a manipulation of the unlock switch 19 is detected. Therefore, unless a manipulation of the unlock switch by the user is detected, all of the judgment results of the steps S1, S5, S8, S11 and S15 show false, whereby the door open/close processing is substantially regarded as unexecuted.

When the user manipulates the unlock switch 19 to open the door 2, an unlock signal is output from the unlock switch 19, whereby the value 1 is set to the state storing flag F in the RAM 14, as described above.

Then, the CPU 12, repeating the door open/close processing in predetermined cycles detects it in the judgment processing of the step S1, temporarily prohibits normal operations such as loading/correcting of the information storage medium 7 by the carrier 6 (step S2), and then the CPU 12, serving as an evacuation instruction output means, outputs to the shaft control driver 18 of the motor M1 an evacuation position moving instruction (step S3).

The evacuation position moving instruction is an instruction to move the carrier 6 from the current position to the evacuation position X2. In a case that the motor M1 is formed of a stepping motor or the like, it is achieved, for example, in the inner processing of the CPU 12 by obtaining an incremental traveling distance of the carrier 6 from the current position to the evacuation position X2 detected by the absolute encoder as pulse numbers corresponding to the rotation of the motor M1, and transferring the value to the shaft control driver 18. The shaft control driver 18, incorporating an error register therein, temporarily stores the pulse numbers transferred from the CPU 12, and outputs to the motor M1 a driving pulse as a moving instruction in each prescribed cycle, while automatically subtracting the pulse numbers where the output is completed. Therefore, when the value of the error register indicates 0, that is, when the carrier 6 reaches the evacuation position X2, the inner processing ends. Instead of the error register, the CPU 12 may perform pulse distribution processing by itself. In this case, it is performed in such a manner that the pulse numbers corresponding to the rotation of the motor M1 is set to a distribution value storing register in the RAM 14, and each time a task of the shaft control processing is performed, the drive instruction pulse is output to the shaft control driver 18 to thereby drive-control the motor M1 via the shaft control driver 18. In this case, the shaft control driver 18 entirely serves as an electric power amplifier, so that the subtraction processing of the pulse, which has been output, is achieved by the CPU 12 performing the subtraction processing to the distribution value storing register in the RAM 14. When the value of the distribution value storing register indicates 0, the substantial pulse distribution processing is in the state of unexecuted.

Further, in a case that the motor M1 is formed of a typical induction motor or the like, it may be achieved by outputting to the motor M1 a constant rotation instruction in which the traveling distance is unlimited, and detecting the carrier 6 arriving at the target position by a limit switch or the like provided in the casing 3, to thereby stop the driving of the motor M1.

In this way, the CPU 12, starting the driving of the motor M1, sets to the state storing flag F the value 2 indicating that the carrier 6 is moving, and ends the door open/close processing of that cycle (step S4).

As a result of the value of the state storing flag F indicating 2, in the door open/close processing in the next cycle or later, judgment processing, for knowing whether the carrier 6 has reached the evacuation position X2 or not, is performed after the judgment processing of the steps S1 and S5 is performed (step S6).

As described above, if the motor M1 is formed of a stepping motor or the like, the carrier 6 is confirmed to reach the evacuation position X2 when the flushing of the instruction value, from the error register of the shaft control driver 18 or from the distribution value storing register in the RAM 14, is completed and the error value indicates zero, and if the motor M1 is formed of a typical induction motor or the like, it is confirmed to reach the evacuation position X2 when the signal from the limit switch or the like provided in the casing 3 is confirmed.

By the time the carrier 6 reaches the evacuation position X2, a judgment result in the step S6 shows false. Therefore, in the door open/close processing in each predetermined cycle, the judgment processing of the steps S1, S5 and S6 is simply repeated.

When the carrier 6 is confirmed to reach the evacuation position X2 by the judgment processing of the step S6, the CPU 12 sets, to the state storing flag F, the value 3 which shows the carrier 6 stops at the evacuation position X2, and ends the door open/close processing of that cycle (step S7). If the motor M1 is formed of a stepping motor or the like, the flushing of the indication value from the error register of the shaft control driver or from the distribution storing register in the RAM 14 is completed and the error value indicates 0, so that there is no need to concern that the motor M1 is overdriven. However, if the motor M1 is formed of a typical induction motor or the like, it is required to stop the output of the constant rotation instruction to the shaft control driver 18 in the processing of the step S7 so as to stop the driving of the motor M1.

In this way, as a result of the value of the state storing flag F indicating 3, in the door open/close processing in the next cycle or later, judgment processing, for knowing whether a door opening confirmation signal from the open/close state detecting sensor 20 is input or not, is performed after the judgment processing of the steps S1, S5 and S8 is performed (step S9).

In this stage, since the carrier 6 has already reached the evacuation position X2 and stopped, the pressure receiving position 44 of the lever 33 provided to the auto lock/unlock mechanism 31 is pressed by the bottom surface of the carrier 6. Thus, the lever 3 takes a posture of the activated state, that is, oscillated in a counterclockwise direction from the state shown in FIG. 6, in which the tip portion 28a of the lock pin 28 is removed downward from the through hole 17 which is the engagement portion of the door 2, and the lock mechanism 30 is in the unlocked state. Therefore, it is possible to freely perform a manual opening manipulation of the door 2.

Practically, it is up to the user in which point after this stage he/she opens the door 2. By the time the user opens the door, the judgment processing of the steps S1, S5, S8 and S9 is simply repeated in the door open/close processing of each predetermined cycle.

When the user actually opens the door 2, a door opening confirmation signal is output from the open/close state detecting sensor 20. This is detected by the CPU 12 repeating the door open/close processing in each predetermined cycle, in the judgment processing of the step 9. Then, the CPU 12 sets to the state storing flag F the value 4 which shows the door 2 is in the opening state, and ends the door open/close processing of that cycle (step S10).

In this way, as a result of the value of the state storing flag F indicating 4, in the door open/close processing in the next cycle or later, judgment processing, for knowing whether a door closing confirmation signal from the open/close state detecting sensor 20 is input or not, is performed after the judgment processing of the steps S1, S5, S8 and S11 is performed (step S12).

When the door opens, the user can put a hand in the casing 3 to freely perform operations such as an exchange of the information storage medium 7. In this stage, the carrier 6 is completely stopped, so that a problem of the hand being caught by an unintentional movement of the carrier 6 will never be caused.

It is up to the user at which point after this stage he/she closes the door 2. By the time the user closes the door, the judgment processing of the steps S1, S5, S8, S11 and S12 is simply repeated in the door open/close processing of each predetermined cycle.

In other words, unless the user completely closed the door 2 and the door closing confirmation signal is output from the open/close state detecting sensor 20, the CPU cannot perform processing other than the judgment processing of the steps S1, S5, S8, S11 and S12. Even if the user manipulates switches by mistake for any reason, the carrier 6 will never moves vertically, and the conveying roller, the conveying belt, the pickup hand or the like in the carrier 6 will never be driven. Therefore, a problem of a hand or a finger being caught in the movable part in the device is completely prevented.

When the user finished necessary operations and completely closed the door, a door closing confirmation signal is output from the open/close state detecting sensor 20. Then, the CPU 12, repeating the door open/close processing in each predetermined cycle, detects this signal in the judgment processing of the step S12.

In this way, only when a door closing confirmation signal is detected following a door opening confirmation signal, the door is considered to be surely closed, and the next processing is permitted to start.

Next, the CUP 12, serving as a return instruction output means, outputs a home position return instruction to the shaft control driver 18 of the motor M1 (step S13).

The home position return instruction is an instruction for moving the carrier 8 from the evacuation position X2 to the home position HP. In a case of the motor M1 being formed of a stepping motor or the like, it is achieved by transferring, to the error register of the shaft control driver 18, the pulse numbers (fixed value) corresponding to the rotation of the motor M1, which corresponds to the incremental traveling distance from the evacuation position X2 to the home position HP. As described above, the pulse distribution processing can also be performed using the distribution value storing register in the RAM 14, instead of the error register.

In a case of the motor M1 being formed of a typical induction motor or the like, it is achieved by outputting the constant rotation instruction, in which the traveling distance is unlimited, to the motor M1, and detecting, by the limit switch or the like provided in the casing 3, the carrier 6 having been reached the home position, to thereby stops the driving of the motor.

In a case that a command related to the loading/correction of the information storage medium 7 has been input at the time before the unlock switch 19 is operated, and the destination of the carrier 6 has been designated, a value of the pulse numbers corresponding to the traveling distance to the designated moving position may be set to the error register or to the distribution value storing register, instead of the pulse numbers corresponding to the traveling distance to the home position HP.

The CPU, which started driving of the motor M1 in this way, sets to the state storing flag F the value 5 showing that the carrier 6 is moving, and ends the door open/close processing of that cycle (step S14).

Along with the driving of the motor M1, the carrier 6 immediately starts ascending operation, and as the bottom surface of the carrier 6 leaves the pressure receiving portion 44, the lock pin 28 is gradually pushed up by the elastic return force of the coil spring 32 which is the elastic urging means. When the tip portion 28a of the lock pin 28 enters again into the through hole 17 which is the engagement portion of the door 2, the lock mechanism 30 is again in the locked state, so that the opening manipulation of the door 2 is completely prohibited.

The ascending operation of the carrier 6, that is, the ascending operation of the lock pin 28 is performed only when the judgment result of the step S12 shows true and the completely locked state of the door 2 is confirmed, that is, in the state that the tip portion 28a of the lock pin 28 is ensured to be capable of accurately engaging in the through hole 27 which is the engagement portion of the door 2. Therefore, no problem of the tip portion 28a of the lock pin 28 hooking an edge or the like of the door 2 will arise. The locked state of the lock mechanism 30 can be ensured by reliably inserting the tip portion 28a of the lock pin 28 into the through hole 27.

As a result of the value of the state storing flag F indicating 5, in the door open/close operation in the next cycle of later, judgment processing for knowing whether the carrier 6 has reached the home position HP or not is performed after performing the judgment processing of the steps S1, S5, S8, S11 and S15 (step S16).

As described above, if the motor M1 is formed of a stepping motor or the like, the carrier 6 is confirmed to reach the home position HP when the flushing of the instruction value from the error register of the shaft control driver 18 or the distribution value storing register in the RAM 14 is completed and the error value shows 0. If the motor M1 is formed of a typical induction motor or the like, it is confirmed to reach the home position HP when a signal from the limit switch or the like provided in the casing 3 is confirmed.

By the time the carrier 6 reaches the home position HP, the judgment result of the step S16 indicates false. Therefore, in the door open/close processing in each predetermined cycle, the judgment processing of the steps S1, S5, S8, S11, S15 and S16 is simply repeated.

Then, when it is confirmed in the judgment processing of the step S16 that the carrier 6 has reached the home position HP, the CPU 12 sets to the state storing flag F the initial value 0 which is the value showing the open/close manipulation and the locking manipulation of the door 2 has been completed (step S17), releases the restriction of the normal operation set in the step S2, and returns to the initial state (step S18).

As a result that the state of each unit of the device and the processing operation of the CPU 12 return to the initial state and the value of the state storing flag F resets to 0, the door open/close processing is substantially kept in the unexecuted state, unless the user again manipulates the unlock switch 19.

It should be noted that in a case of the door 2 being required to be opened while the carrier 6 is in the state of being located at the normal operational area X1, the locked state of the lock mechanism 30 can be released to be in the unlocked state, by inserting the tip of a screwdriver or a hexagon wrench into a small hole 55 (see FIG. 2) perforated in the bottom surface of the casing 3, so as to push up the extended lever portion 43 of the lever 33 and to forcibly oscillate the lever 33.

As described above, in the present invention, the auto lock/unlock mechanism 31 is composed solely of mechanical elements, and the bottom surface of the carrier 6 moving from the normal operational area X1 to the evacuation position X2 presses the pressure receiving portion 44 of the lever 33, to thereby unlock the lock mechanism, while a movement of the carrier 6 from the evacuation position X2 to the operational area X1 presses up the tip portion 28a of the lock pin 28 using the elastic force of the coil spring 32, to thereby return the lock mechanism 3 to the locked state. Therefore, an electric part for locking/unlocking manipulation of the lock mechanism 31 is not required at all.

Further, forced stopping processing of the motor M1, which is the driving source of the carrier 6, or the like is not required. Therefore, there is no concern of causing an adverse effect such as a damage or an overload to each part of the mechanism.

As a means for feeding the carrier 6, one having a large speed-reducing ratio, such as a lead screw and a nut or a ball screw and a socket, is used. Therefore, even in a case that the conducting to the motor M1 is stopped and the carrier 6 is retained at the evacuation position X2 against the elastic urging force of the coil spring 32, the carrier 6 has the enough ability to keep the home position. Therefore, there is no need to supply electric power to the motor M1 for keeping the home position, and there is no problem of an overload to the motor M1.

Further, the lock pin 28 constituting the main part of the lock mechanism 30 is constantly urged, by the coil spring 32, in a direction of entering into the through hole 27 which is the engagement portion of the door 2. Therefore, even in a case that the carrier 6 frequently moves up and down in the normal operational area X1, no problem of the lock pin 28 being removed and the locking state of the door 2 being released, will arise.

The operation of the automatic medium changer 1, to which the auto lock/unlock mechanism 31 in FIGS. 5 and 6 is applied, has been described as an example. As for the operational effects thereof, the cases, in which the auto lock/unlock mechanism 47 in FIG. 7, the auto lock/unlock mechanism 51 in FIG. 8, and the auto lock/unlock mechanism 52 in FIG. 8 are used, achieve the same effects.

Further, the storing cells of the medium storing unit may be continuingly arranged in the horizontal direction or the medium storing unit and the read/write unit may overlap in the horizontal direction, depending on the structure of the automatic medium changer. However, basically, the automatic medium changer may be configured in such a manner that the carrier is made to contact the lever of the auto lock/unlock mechanism to thereby cause the lock mechanism to be in the unlocked state when the carrier is located at a position deviating from the area where the carrier loads/corrects an information storage medium to/from the medium storing unit or the read/write unit, while the contact between the carrier and the lever is released to thereby cause the lock mechanism to be in the locked state when the carrier is within the area (normal operational area) where the carrier is capable of loading/correcting an information storage medium to/from the medium storing unit or the read/write unit. The position, where the lever should be arranged at, is a matter of design, which should be decided depending on the structure of the automatic medium changer.

Irrespective of the structure applied, by setting the evacuation position of the carrier at a place outside the space formed between the door and the medium storing unit, the carrier is always located at a position deviating from the front area of the medium storing unit when the door opens with the lock mechanism being unlocked. Therefore, the user can easily perform operations such as an exchange of an information storage medium without being disturbed by the presence of the carrier. For example, in a case of the read/write unit 5 being disposed below the medium storing unit 4 as shown in FIG. 2, the user can easily perform operations such as an exchange of an information storage medium 7 with the structure in which the evacuation position of the carrier 6 is set far below than the read/write unit 5.

(Effects)

In the automatic medium changer of the present invention, the auto lock/unlock mechanism is composed solely of mechanical elements, and the lock mechanism is so formed as to switch between the unlocked state and the locked state using the movement of the carrier. Consequently, an electric actuator such as a solenoid is not required, whereby it is possible to provide an automatic medium changer having an auto lock/unlock mechanism at a lower price.

Further, when the carrier is moving within the normal operational area, the opening manipulation of the door is completely restricted since the lock mechanism is kept in the locked state. Therefore, it is not required to forcibly stop the carrier coping with an inadvertent opening manipulation of the door. This solves the problems of damages or overloads to the device.

The lever constituting a part of the auto lock/unlock mechanism can be formed of a lever which oscillates by receiving a pressure from the carrier to thereby change the posture, or of a linear movement member formed integral with the lock pin. In particular, in the case of the lever being formed of a linear movement member, there are advantages of a reduction in the number of the parts and a reduction in the manufacturing cost.

Further, the lever constituting a part of the auto lock/unlock mechanism is provided with an emergency operational portion which can be operated from the outside of the casing. Thereby, even in a case that the lock mechanism cannot be switched to the unlocked state by the movement of the carrier because of a device failure or bad loading of an information storage medium in the medium storing unit or read/write unit, it is possible to open the door by forcibly unlocking the lock mechanism.

As an elastic urging means for urging the lock pin, a coil sprig or a helical torsion spring can be used. In a case of using a coil spring, the coil spring is mounted on the lock pin in the outside engagement. In a case of using a helical torsion spring, it is mounted by engaging the bent portion of the helical torsion spring to the outside of the oscillation center of the lever. Therefore, there is no need to provide a specific space for disposing the urging means, which makes it easy to miniaturize the device.

Further, the unlock switch and the open/close state detecting sensor are provided to the casing, and the moving operation of the carrier required to unlock the lock mechanism is automated by the controller controlling the driving source of the carrier. Thereby, the lock mechanism can be easily unlocked by retaining the carrier at the evacuation position only with a manipulation of the unlock switch.

Moreover, when making the lock mechanism return to the locked state again, the carrier is moved in a direction of the lock mechanism being operated after confirming, by the open/close state detecting sensor, the door being closed. Therefore, it is possible to reliably ensure the door being locked, by always engaging accurately the engagement portion of the door with the lock pin or the stopping pawl of the casing.

Further, the function of the controller is served by the control unit which drive-controls the automatic medium changer as a whole. Thereby, there is no need to additionally dispose a dedicated control means, which makes it possible to provide an automatic medium changer at a low price.

Further, since the evacuation position of the carrier is set at a position outside the space formed between the door and the medium storing unit, an empty space must be formed between the medium storing unit and the door in the state of the door being opened. Therefore, the user can perform smooth operations, such as an exchange of an information storage medium, to the medium storing unit without being disturbed by the carrier.

What is claimed is:

1. An automatic medium changer comprising:
 a casing having an openable door;
 a medium storing unit storing a plurality of information storage media;

a read/write unit reading data from and writing data into the information storage media;

a carrier which reciprocates between the medium storing unit and the read/write unit;

a lock mechanism which is capable of locking the door to the casing so as to be in an unopenable state; and a mechanical auto lock/unlock mechanism, wherein the mechanical auto lock/unlock mechanism causes the lock mechanism to be in an unlocked state when the carrier is located at an evacuation position and causes the lock mechanism to be in a locked state when the carrier moves from the evacuation position to a normal operational area, wherein the mechanical auto lock/unlock mechanism is disposed at a position where the mechanical auto lock/unlock mechanism is operated with a pressure applied by the carrier moving from the normal operational area to the evacuation position.

2. The automatic medium changer, as claimed in claim 1, wherein the lock mechanism comprises an engagement portion formed on the door and a lock pin provided in the casing, wherein the auto lock/unlock mechanism comprises an elastic urging means urging the lock pin in a direction of engaging a tip portion of the lock pin with the engagement portion, and a lever moving the lock pin in a direction of disengaging the tip portion of the lock pin from the engagement portion, the lever is disposed at a position where the lever is operated with a pressure applied by the carrier moving from the normal operational area to the evacuation position.

3. The automatic medium changer, as claimed in claim 2, wherein the lever is so configured as to oscillate with a pressure applied by the carrier to thereby move the lock pin.

4. The automatic medium changer, as claimed in claim 2, wherein the lever comprises a linear movement member formed integral with the lock pin.

5. The automatic medium changer, as claimed in claim 1, wherein the lock mechanism comprises an engagement portion formed on the door and a stopping pawl formed on one end of an oscillation lever provided in the casing, the auto lock/unlock mechanism comprises an elastic urging means rotationally urging the oscillation lever in a direction of engaging the stopping pawl with the engagement portion, and a pressure receiving portion located on the oscillation lever which, by receiving a force from an outside, oscillates the oscillation lever in a direction of disengaging the stopping pawl from the engagement portion, and the oscillation lever is disposed at a position where the pressure receiving portion is pressed by the carrier moving from the normal operational area to the evacuation position.

6. The automatic medium changer, as claimed in claim 2, wherein the lever includes an emergency manipulation portion with which the lever is moved against an urging force applied by the elastic urging means, and the casing has a small hole perforated manipulating the emergency manipulation portion from an outside.

7. The automatic medium changer, as claimed in claim 2, wherein the elastic urging means is formed of a coil spring.

8. The automatic medium changer, as claimed in claim 2, wherein the elastic urging means is formed of a helical torsion spring.

9. The automatic medium changer, as claimed in claim 1, wherein in the casing, an unlock switch requesting the lock mechanism to unlock, an open/close state detecting sensor confirming an open/close state of the door, and a controller controlling a driving source of the carrier are arranged in juxtaposition, and the controller is provided with an evacuation instruction output means, upon receipt of an unlock signal from the unlock switch, outputting to the driving source an evacuation position moving instruction, and a return instruction output means, when confirming that a door opening confirmation signal and a door closing confirmation signal from the open/close state detecting sensor are received in this order, outputting to the driving source a home position return instruction.

10. The automatic medium changer, as claimed in claim 9, wherein a function of the controller is served by a control unit drive-controlling the automatic medium changer as a whole.

11. The automatic medium changer, as claimed in claim 1, wherein the evacuation position of the carrier is set at a position outside a space formed between the door and the medium storing unit.

12. An automatic medium changer, comprising:

a casing having an operable door;

a medium storage unit which stores a plurality of information storage media;

a read unit which reads data from the information storage media;

a carrier movable in a first direction so as to be alternatively disposed adjacent to the read unit and the medium storage unit; and a locking mechanism adapted to lock the operable door, wherein the carrier is configured to receive one of said plurality of information storage media in a second direction normal to the first direction when in a evacuation position, wherein the locking mechanism is adapted to unlock the operable door by pressure applied by the carrier when the carrier is positioned in the evacuation position.

* * * * *